United States Patent [19]

Cummings

[11] 4,222,181
[45] Sep. 16, 1980

[54] MOBILE EDUCATIONAL TOY

[76] Inventor: Darold B. Cummings, 808 McCarthy Ct., El Segundo, Calif. 90245

[21] Appl. No.: 851,343

[22] Filed: Nov. 14, 1977

[51] Int. Cl.³ .................... A63H 19/15; G09F 7/10
[52] U.S. Cl. .................... 35/73; 35/35 H; 40/605; 40/618; 46/201
[58] Field of Search .............. 35/35 H, 35 J, 69, 70, 35/71, 73; 40/538, 584; 46/97–99, 103, 104, 106, 111, 112, 113, 201, 202, 216, 218, 221, 222, 223

[56] References Cited

U.S. PATENT DOCUMENTS

| | | | |
|---|---|---|---|
| 1,864,703 | 6/1932 | West | 35/71 |
| 2,342,237 | 2/1944 | Barbieri | 40/618 X |
| 2,510,884 | 6/1950 | Greene | 35/73 X |
| 2,958,961 | 11/1960 | Wheeler | 35/73 |
| 3,611,629 | 10/1971 | Foley | 46/201 |
| 3,802,121 | 4/1974 | Nielsen | 46/201 |
| 3,996,692 | 12/1976 | Daenen | 46/17 |

FOREIGN PATENT DOCUMENTS 749444  5/1956  United Kingdom ............ 35/35 J

OTHER PUBLICATIONS

"Alphabet Block Train" p. 151 of Nov. 1946 Popular Science Magazine.
Montgomery Ward 1963 Christmas Catalog, "Klickety-Klack Express" pp. 250, 251.
Creative Playthings Catalog, "Jumbo Diesel Train" p. 52 only.
Montgomery Ward 1974 Christmas Catalog, "Alphabet Train" pp. 308, 309.

Primary Examiner—Harland S. Skogquist
Attorney, Agent, or Firm—Charles T. Silberberg

[57] ABSTRACT

A mobile educational toy which simulates a train has a plurality of toy units which are coupled together to form a train. The toy units each include a mobile carriage structure and a graphic block. The graphic blocks are shaped in the form of an alphabet letter, number, or other symbol. By arranging the toy units in a specified order, words or other relationships can be formed by the user. In addition, by virtue of the coupling together of the toy units, a toy simulating a train is formed.

11 Claims, 5 Drawing Figures

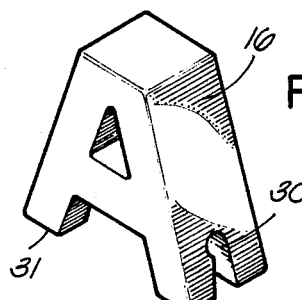
FIG. 3
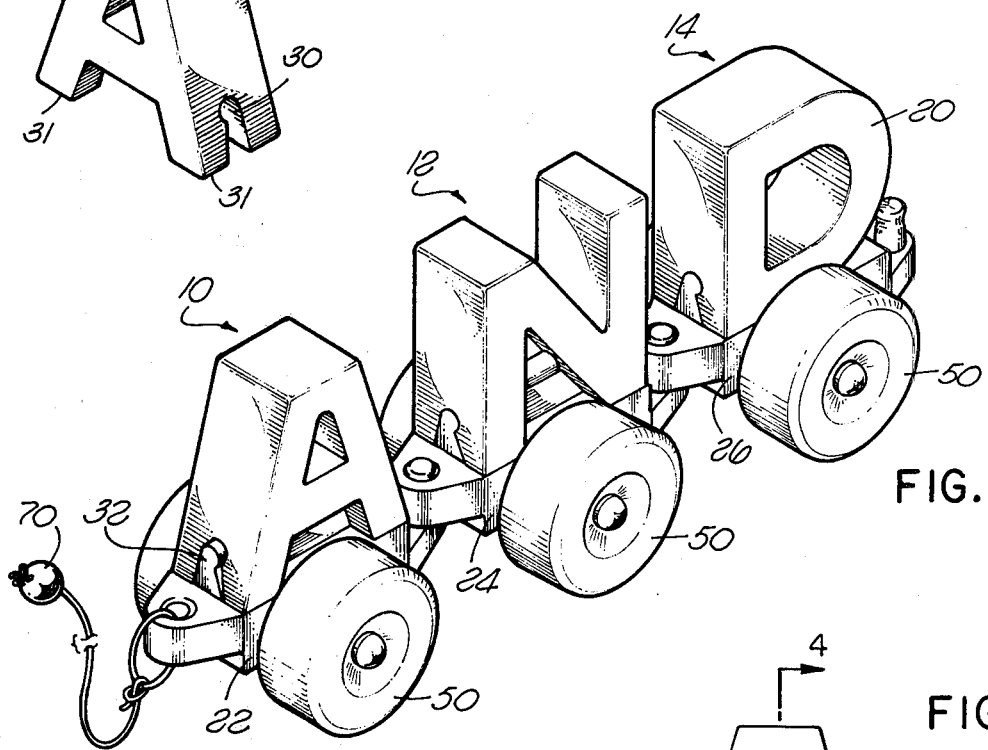
FIG. 1
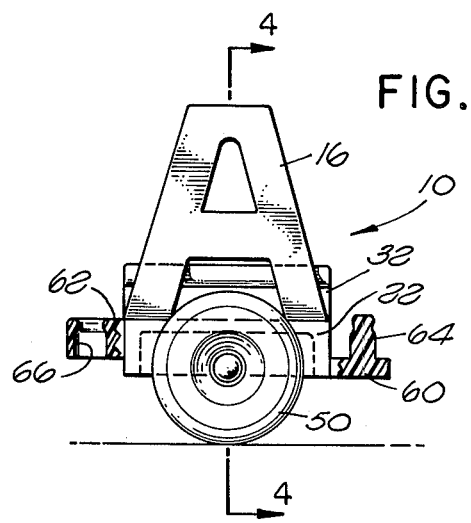
FIG. 2
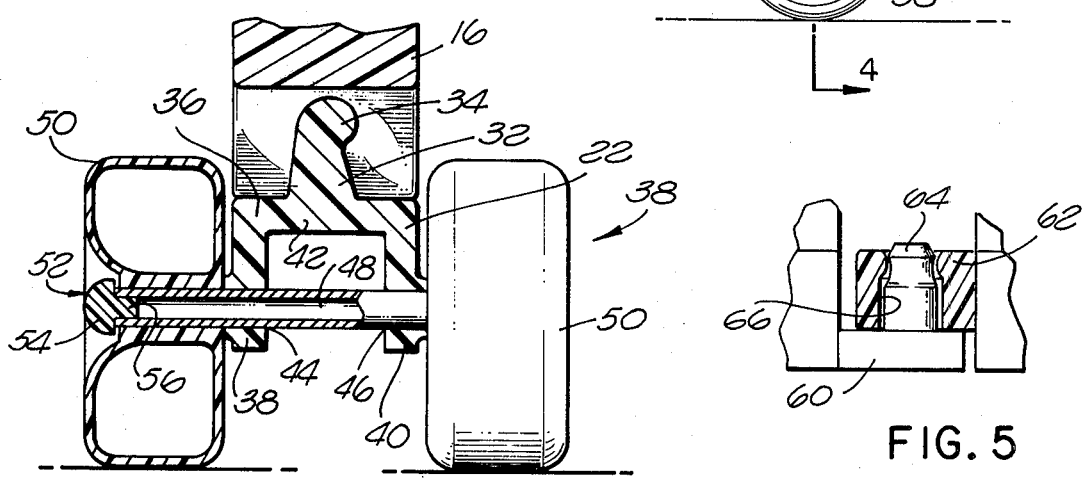
FIG. 4
FIG. 5

MOBILE EDUCATIONAL TOY

BACKGROUND OF THE INVENTION

This invention relates generally to an educational toy for children. More specifically, the invention relates to a toy for small children which will have the appeal of a toy structure, but which at the same time may be made useful in teaching the child such things as the ability to count, letters of the alphabet, words, etc.

Other educational toys which attempt to accomplish the above purposes have been devised. For example, U.S. Pat. No. 2,459,321 to Johnson, and 2,680,306 to Moyer. However, these inventions have not been overly successful by virtue of either being complex, overly expensive, or not having the desirable and unique features of the present invention.

The Johnson patent discloses a flat block which has four wheel mounted thereto and a transverse recess such that the appearance of a vehicle with a seating compartment is given. A plurality of members can be joined laterally by use of the placement of a bar through the slots of the toy unit, the toy units being disposed side by side. On the top face of the blocks are printed indicia such as letters and numbers. In essence, Johnson discloses a mobile carriage with printed indicia thereon. There is no tactile graphic block in the form of an alphabet letter or number disclosed, let alone one connected to the flat vehicle block. Nor would the inventor desire such due to his concern with the flat block looking like a vehicle. Further, the Johnson toy units are rigidly connected to one another in side by side relationship as opposed to being pivotally connected in longitudinal alignment such that a train can be simulated. The Moyer invention discloses a vehicle toy in the form of a truck having a bed in which various non-uniform non-tactile members can be placed. On these blocks are printed numbers such that the combination of blocks can be totaled into a corresponding sum. A mechanical computing mechanism associated with the blocks indicates the sum corresponding to the blocks placed in the bed of the truck. Again, this invention does not use graphic tactile blocks. In addition, it is limited to numbers only, i.e. computation. Significantly, this is a singular toy unit, i.e. a truck, which is not coupled to any other such unit. The truck is a four wheeled vehicle.

Previous inventions have been disclosed which utilize tactile letter blocks. Thus, U.S. Pat. No. 3,270,452 to D'Elia discloses a sign (not a toy) with interchangeable characters. However, this sign is not intended to be mobile and no carriage structure is accordingly disclosed which would connect to the graphic blocks. It should also be noted that the connection between the letters is a rigid one.

Train-like toys, such as that disclosed in U.S. Pat. No. 2,383,441 to Beile, have been disclosed in the prior art. However, this toy is designed for a constructional purpose as opposed to the teaching of the alphabet, words, arithmetic, etc. by the use of a plurality of toy units, each comprising a mobile carriage with a graphic block connected thereto and a coupling means such that the unit can be coupled together to indicate various relationships such as words, equations, etc.

SUMMARY OF THE INVENTION

It is, therefore, an object of the present invention to provide a simple, inexpensive mobile educational toy which simulates a train and at the same time educates the user in a symbolic relationship, such as those between letters to form words.

It is another object of the present invention to provide a mobile educational toy which gives a tactile and visual presentation of educational indicia.

Briefly, in accordance with the invention, there is provided an educational toy which comprises a plurality of toy units that when coupled together simulate a train. Each of these units comprise a mobile carriage structure, a graphic block, and a coupling means for linking to other toy units. Each of the graphic blocks is shaped in the form of an alphabet letter, number, or other symbol. The carriage structure which is connected to the graphic block has a wheel means and a base. The wheel means is connected to the base. The wheel means makes the carriage mobile.

In the preferred embodiment, the coupling means of the toy units provides a detachable linking of the toy units and pivotally links the toy units to one another in longitudinal alignment.

Other objects and advantages of the invention will become apparent upon reading the following detailed description and upon reference to the drawings.

BRIEF DESCRIPTION OF THE DRAWINGS

FIG. 1 is a perspective view of a plurality of toy units in accordance with the present invention linked together for educational purposes and to simulate a train;

FIG. 2 is a side elevational view of one of the toy units with portions thereof in cross section;

FIG. 3 is a perspective view of one of the graphic blocks;

FIG. 4 is a fragmentary sectional view of the carriage structure taken in the direction of arrows 4—4 of FIG. 2 showing the connection of the carriage structure to the graphic block;

FIG. 5 is a detail view with portions in cross section of the coupling means for linking the toy units together.

While the invention will be described in connection with the preferred embodiment, it will be understood that it is not intended to limit the invention to this embodiment. On the contrary, it is intended to cover all alternatives, modifications, and equivalents that may be included within the spirit and scope of the invention as defined by the appended claims.

DETAILED DESCRIPTION OF THE INVENTION

There is shown in FIG. 1 a plurality of toy units generally indicated at 10, 12, and 14 respectively, constructed in accordance with the present invention coupled together to form the word "AND." Each of the toy units 10, 12, and 14 comprise a graphic block 16, 18, and 20 respectively and a connected mobile carriage structure designated 22, 24, and 26 respectively.

While the graphic block and carriage of the toy units can be integrally formed, it is preferred to have them as separate elements which have a detachable connection. As such, there need not be a carriage structure for each graphic block which helps to reduce the cost of the present invention.

FIG. 3 illustrates graphic block 16 which is in the form of a letter "A." Alternatively, the graphic blocks could be in the form of numbers or other symbols. By the use of this form of block, the user is given a visual and tactile indication of the symbol to aid in its identification. The graphic blocks may be hollow or solid and formed of any suitable material such as wood, plastic, or rigid foam. If plastic, the blocks would preferably be blow or roto-molded. The size of the blocks is optimally uniform such that they are interchangeable with one another. In order to provide for the detachable connection of the block to the carriages, the graphic block is provided with a longitudinal groove 30 which is cut upwardly from the bottom surface 31 of the block 16.

As shown in FIGS. 2 and 4, block 16 is connected to carriage 22 by means of a ridge or flange 32 which is positioned in groove 30. Ridge 32 is preferably offset as at 34 so that the graphic block will not disengage from the carriage when lifted vertically by the block 16 and to assure proper connection of the block to the carriage, i.e., so that a non-symmetrical block such as 14, the letter "D" in FIG. 1, will face in the correct direction. The carriage structure which can also be made of any suitable material, such as wood or plastic, comprises a base 36 and a wheel means generally indicated at 38. Base 36 is in the form of a fork-shaped structure having two downwardly extending legs 38 and 40 divided by a transverse portion 42. Ridge 32 is preferably integral with member 36 and projects upwardly from portion 42. In legs 38 and 40 are provided transverse aligned holes 44 and 46 respectively. These holes provide a transverse bore through which axle 48 of wheel means 38 is positioned. Axle 48 rotatably connects wheel means 38 to base 36. Wheels 50 are mounted on axle 48 on opposite longitudinal sides of carriage 22 outside of legs 38 and 40. Caps 52 retain wheels 50 on axle 48. When axle 48 is hollow as shown, this can be accomplished by cap 52 having an enlarged head 54 and a smaller shank 56 with the shank 56 fitting within axle 48 and the enlarged head 54 restraining outward movement of wheels 50. Alternatively, one wheel mounted to axle 48 between legs 38 and 40 could be used, but this is not preferred.

FIGS. 2 and 5 illustrate the coupling means of the present invention used to link the toy units to one another. On opposite lateral sides of carriage 22 are provided flanges 60 and 62. Projecting upwardly from flange 60 is a stud 64. Within flange 62 is provided an aperture 66. Stud 64 and aperture 66 are shaped such that when stud 64 is positioned within aperture 66, there is a snap fitting which allows pivotal movement of the members so connected while also being manually detachable. By virtue of the flanges being on opposite lateral ends of the carriage, the units are connected in longitudinal alignment.

Referring again to FIG. 1, it is seen that the toy units 10, 12, and 14 are connected to one another by attaching a corresponding stud 64 and aperture 66 of each unit. The outer unit, in this case 10, would not use its aperture 66 for connection to another unit, and so a detachable pull string 70 can be tied therethrough. With the units 10, 12, and 14 coupled as shown, it is seen that the toy structure simulates a train by virtue of the plurality of units or "cars" which are pivotally connected to one another in longitudinal alignment as is typical with a train. The pivotal connection also allows for turning the train around corners and in circles. In addition, by joining a number of the toy units together, the graphic blocks can be arranged for various educational purposes, i.e. to teach the order of the letters of the alphabet, words, addition, equations, etc.

Thus, it is apparent that there has been provided, in accordance with the invention, a mobile educational toy that fully satisfies the objects, aims, and advantages set forth above. While the invention has been described in conjunction with specific embodiments thereof, it is evident that many alternatives, modifications, and variations will be apparent to those skilled in the art. Accordingly, it is intended to embrace all such alternatives, modifications, and variations as fall within the spirit and scope of the appended claims.

What is claimed is:

1. An educational toy comprising a plurality of toy units, each unit comprising a mobile carriage structure, a single graphic block, and a coupling means for linking to other toy units, said coupling means providing for a detachable and pivotal linking in longitudinal alignment to other toy units, said coupling means being attached to said carriage structure, each of said graphic blocks being shaped in the form of an alphabet letter, number, or other symbol, said carriage structure being securely connected to said graphic block such that said carriage structure can be lifted by grasp of said graphic block, said carriage structure having a wheel means and a base, said wheel means being connected to said base, said wheel means making said carriage structure mobile, said plurality of toy units being detachably coupled to each other such that symbolic relationships between said graphic blocks can be formed by selective arrangement of said toy units.

2. The educational toy of claim 1, wherein said carriage structure is connected to said graphic block such that said graphic block is substantially fully visible in side elevational view of said toy unit.

3. The educational toy of claim 2 wherein said graphic block is connected to said carriage structure in fixed alignment relative to said carriage structure.

4. The educational toy of claim 3 wherein said wheel means comprises at least one wheel and a maximum of two wheels.

5. The educational toy of claim 4 wherein said carriage structure and said graphic block are detachable from one another.

6. The educational toy of claim 5 wherein said graphic block has a longitudinal groove cut upwardly from the bottom surface of said graphic block, and said base has a ridge to be positioned in said groove to connect said carriage structure and said graphic block.

7. The educational toy of claim 6 wherein said base has a transverse bore, and said wheel means comprises an axle, two wheels, and two caps, said axle passing through said bore, said wheels being mounted on said axle on opposite longitudinal sides of said carriage structure, said wheels being retained on said axle by said caps.

8. An educational toy comprising a plurality of toy units, each unit comprising a mobile carriage structure, a single graphic block and a coupling means for linking to other toy units, said coupling means providing for a detachable and pivotal linking in longitudinal alignment to other toy units, said coupling means being attached to said carriage structure, each of said graphic blocks being shaped in the form of an alphabet letter, number, or other symbol, said carriage structure being connected to said graphic block, said carriage structure and said graphic block being detachable from one another, said graphic block having a longitudinal groove cut upwardly from the bottom surface thereof, said carriage structure having a wheel means and a base, said wheel means comprising at least one wheel and a maximum of two wheels, said wheel means being connected to said base, said wheel means making said carriage structure mobile, said base having a ridge to be positioned in said groove to connect said carriage structure and said graphic block, said ridge having an offset portion and said groove having a corresponding offset portion, whereby said graphic block can be connected to said carriage structure only if aligned in one specific direction relative to said carriage structure, said plurality of toy units being detachably coupled to each other such that symbolic relationships between said graphic blocks can be formed by selective arrangement of said toy units.

9. The educational toy of claim 8 wherein said carriage structures are of uniform size and appearance.

10. An educational toy comprising a plurality of toy units, each unit comprising a mobile carriage structure, a single graphic block, and a coupling means for linking to other toy units, said coupling means providing for a detachable and pivotal linking in longitudinal alignment to other toy units, said coupling means being attached to said carriage structure, each of said graphic blocks being shaped in the form of an alphabet letter, number, or other symbol, said carriage structure being connected to said graphic block, said carriage structure and said graphic block being detachable from one another, said carriage structure having a wheel means and a base, said wheel means being connected to said base, said wheel means making said carriage structure mobile, said graphic block having a longitudinal groove cut upwardly from the bottom surface thereof, said base having a ridge to be positioned in said groove to connect said carriage structure to said graphic block, said ridge having an offset portion, said groove having a corresponding offset portion, whereby said graphic block can be connected to said carriage structure only if aligned in one specific direction relative to said carriage structure, said plurality of toy units being detachably coupled to each other such that symbolic relationships between said graphic block can be formed by selective arrangement of said toy units.

11. The educational toy of claim 10 wherein said carriage structures are of uniform size and appearance.

* * * * *